(12) United States Patent
Green

(10) Patent No.: US 10,175,407 B1
(45) Date of Patent: Jan. 8, 2019

(54) HOUSING FOR A LIGHT

(71) Applicant: TIRE MART, INC., St. Louis, MO (US)

(72) Inventor: Michael L. Green, St. Louis, MO (US)

(*) Notice: Subject to any disclaimer, the term of this patent is extended or adjusted under 35 U.S.C. 154(b) by 0 days.

(21) Appl. No.: 15/649,579

(22) Filed: Jul. 13, 2017

(51) Int. Cl.
| | |
|---|---|
| *F21V 7/04* | (2006.01) |
| *H01L 33/00* | (2010.01) |
| *F21V 8/00* | (2006.01) |
| *A63H 17/28* | (2006.01) |

(52) U.S. Cl.
CPC ............. *G02B 6/001* (2013.01); *A63H 17/28* (2013.01); *G02B 6/0006* (2013.01)

(58) Field of Classification Search
USPC ........................................................ 362/555
See application file for complete search history.

(56) References Cited

U.S. PATENT DOCUMENTS

| | | | | | |
|---|---|---|---|---|---|
| 5,307,251 | A | * | 4/1994 | Shaffer | F21V 33/0064 116/173 |
| 5,593,354 | A | * | 1/1997 | Falossi | A63B 69/3614 473/220 |
| 5,697,695 | A | * | 12/1997 | Lin | F21L 4/02 362/184 |
| 6,122,041 | A | * | 9/2000 | Najm | G01J 5/061 356/43 |
| 6,217,187 | B1 | * | 4/2001 | Demsko | F21K 2/06 362/102 |
| 6,758,767 | B1 | * | 7/2004 | Wang | A63B 59/60 473/410 |
| 7,021,782 | B1 | * | 4/2006 | Yerian | A01K 63/06 362/101 |
| 8,430,522 | B2 | * | 4/2013 | Ford | F21L 4/00 362/108 |
| 9,322,520 | B1 | * | 4/2016 | Li | G02B 6/0011 |
| 2002/0121295 | A1 | * | 9/2002 | Chen | A45B 3/04 135/16 |
| 2002/0189657 | A1 | * | 12/2002 | Yuan | A45B 3/04 135/65 |
| 2004/0156195 | A1 | * | 8/2004 | Robertson | F21L 4/027 362/186 |

(Continued)

OTHER PUBLICATIONS

5150 Whips 4 Foot LED Whip With Remote, SideBySide UTV Parts, http://www.sidebysideutvparts.com/product/5150-whips-4-foot-led-whip-with-remote.html?gclid=CjwKEAjwgZrJBRDS38GH1Kv_vGYSJAD8j4DfjYM7OL7bWXyhkIF5ZaMHsDjAJLixzwDrI6tBst3vQBoCGPLw_wB, 4 pages—Applicant Admitted Prior Art.

*Primary Examiner* — Tuyen K Vo
(74) *Attorney, Agent, or Firm* — Lathrop Gage L.L.P.

(57) ABSTRACT

A housing includes a head, a head mount, and a bracket. The head includes a midsection, a rod extending from the midsection, and a connection member extending in an opposite direction therefrom. A bore extends through the length of the midsection, the rod, and the connection member. The head mount comprises a hollow receiving member open at a first end and has a bottom face at a second end. The bracket includes first and second bracket sections. A top face of the first section is fixed to the bottom face of the hollow receiving member. In a use position, an inside face of the first bracket section is positioned against a first side of a surface, and an inside face of the second bracket section is positioned against a second opposing side of the surface. The first and second bracket sections are secured together using mechanical fasteners.

20 Claims, 8 Drawing Sheets

(56) References Cited

U.S. PATENT DOCUMENTS

| | | | |
|---|---|---|---|
| 2009/0251078 A1* | 10/2009 | Oh | B60Q 7/00 |
| | | | 315/314 |
| 2010/0067222 A1* | 3/2010 | Yu | A45B 3/04 |
| | | | 362/158 |
| 2010/0190586 A1* | 7/2010 | House | A63B 69/00 |
| | | | 473/446 |
| 2010/0328924 A1* | 12/2010 | Nissen | A45B 3/04 |
| | | | 362/84 |
| 2015/0151178 A1* | 6/2015 | Arner | A63B 71/0622 |
| | | | 473/513 |

* cited by examiner

HOUSING FOR A LIGHT

BACKGROUND

Vehicles which are frequently used in off-road ventures, such as bikes and all-terrain vehicles (ATVs), are occasionally modified to include whips, or lights sticks. Light sticks enhance the aesthetics of the vehicle, but also improve the visibility of the vehicle, especially at night. This improved visibility may prevent accidents which may otherwise occur without the use of light sticks.

In addition to full-scale (1:1) vehicles, whips may be used in the remote control (RC) space to enhance a RC vehicle's look and visibility. However, to date, there has not yet been developed a light stick that is suitable for use on a remote control vehicle.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In one embodiment, a housing for a light stick includes a head, a head mount, and a bracket. The head includes a midsection, a shaft extending in a first direction from the midsection, and a connection member extending in a second direction from the midsection. A bore extends through the entirety of the length of the midsection, the shaft, and the connection member. The head mount comprises a hollow receiving member which is open at a first end and has a bottom face at a second end. Finally, the bracket includes first and second bracket sections. Each section has an outside face and an inside face, and the inside face has a substantially planar portion and a scooped portion formed into the substantially planar portion. A plurality of apertures is formed into the substantially planar portion. A top face of the first section is fixed to the bottom face of the hollow receiving member. In a use position, the first bracket section inside face is positioned against a first side of a surface, and the second bracket section inside face is positioned against a second opposing side of the surface. The first and second bracket sections are secured together using mechanical fasteners inserted through the plurality of apertures in the first and second bracket sections.

In another embodiment, a housing for a light stick, includes a head, head mount, and a bracket. The head includes a tapered midsection having a top edge with a first diameter and a bottom edge with a second diameter. The bottom diameter is larger than the top diameter. A shaft extends in a first direction from the top edge of the midsection, and a diameter of the shaft is substantially similar to the first diameter of the midsection. A connection member extends in a second direction from the midsection. A bore is formed through the entirety of the length of the midsection, the shaft, and the connection member. A rod is inserted into the bore at a top edge of the shaft, forming a friction fit between the rod and the shaft. A light is inserted into the bore at a bottom edge of the connection member, forming a friction fit between the rod and the connection member. The head mount comprises a hollow receiving member, which is open at a first end and has a bottom face at a second end, and an aperture formed therein. The connection member of the head is received into the hollow receiving member. The bracket includes first and second bracket sections, each section having an outside face and an inside face. The inside face has a substantially planar portion and a scooped portion formed into the substantially planar portion, and a plurality of apertures is formed into the substantially planar portion. In a use position, the first bracket section inside face is positioned against a first side of a surface, the second bracket section inside face is positioned against a second opposing side of the surface, and the first and second bracket sections are secured together using mechanical fasteners inserted through the plurality of apertures in the first and second bracket sections.

In still another embodiment, a housing for a light stick, has a head, a head mount, and a bracket. The head includes a shaft and a connection member. A bore extends through the entirety of the length of the shaft and the connection member. A rod is inserted into the bore at a top edge of the shaft; and a light is inserted into the bore at a bottom edge of the connection member. The head mount includes a hollow receiving member which is open at a first end and has a bottom face at a second end. The connection member of the head is received into the hollow receiving member. The bracket includes first and second bracket sections, each section comprising an outside face and an inside face, and a plurality of apertures formed there through.

DETAILED DESCRIPTION

Figure 1:
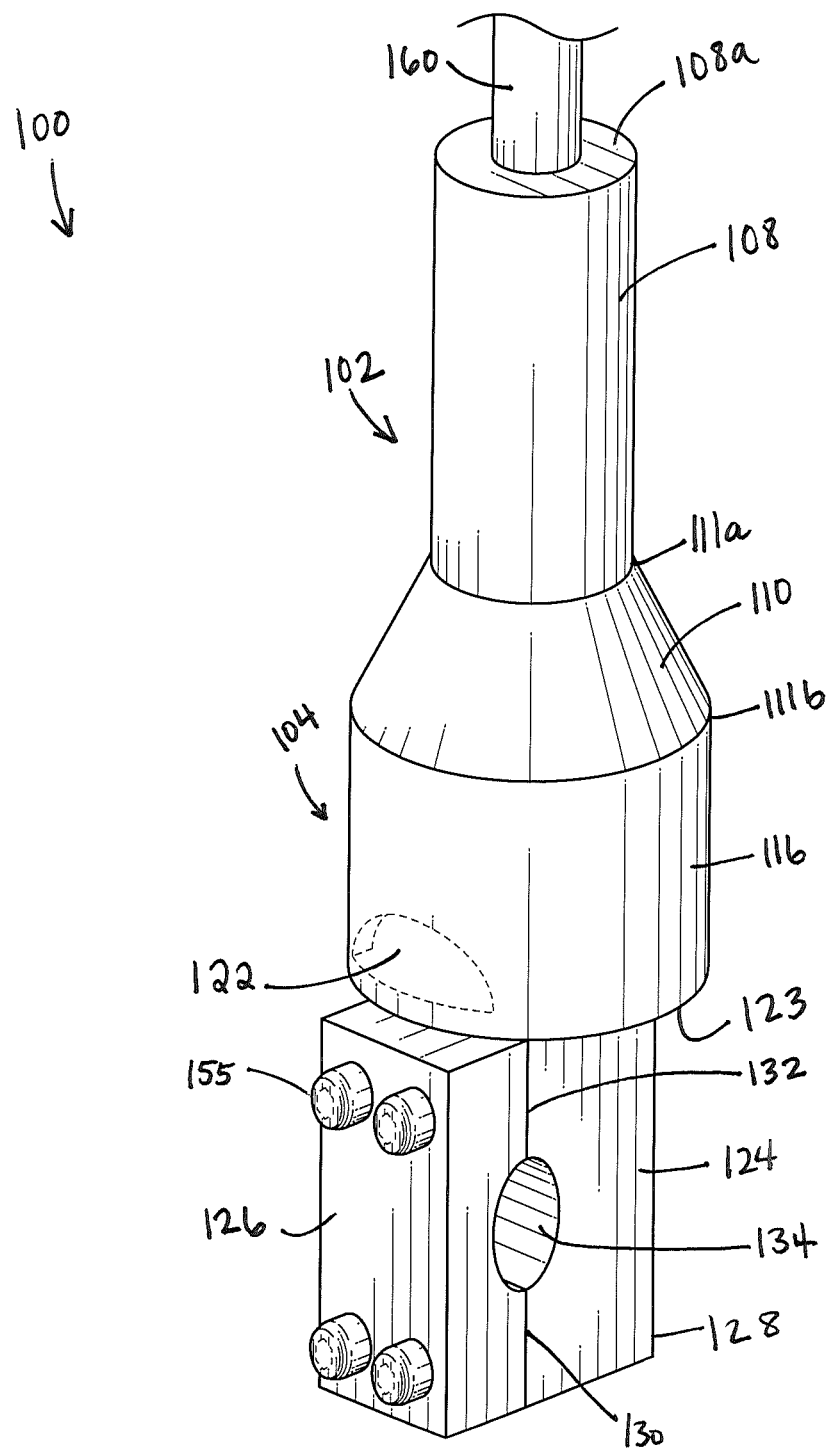
FIG. 1 is a perspective view of a light housing according to one embodiment of the invention.

The market for vehicle enhancement is enormous. Often, people are interested in aesthetically and/or functionally changing their vehicle. The options for modifying a vehicle are numerous, ranging from custom tires, to lift kits, and from color variations to custom tail lights. Vehicles are also commonly raced for sport. Remote control vehicles can be designed to emulate the features of a full scale vehicle, and may also be raced. Often, races occur in the evening. One enhancement that is both aesthetically pleasing and can be beneficial from a safety perspective is a whip stick, or light saber. In full-scale vehicles, light sabers may protect drives of the vehicles by making the vehicle more easily identified when it's dark. For remote control vehicles, while human lives are not at stake, the lights can help prevent destruction of the vehicle. However, until now, there has not been a whip stick that is easily incorporated into the vehicle and provides similar functionality to full size whip sticks.

Embodiments of housings for lights sticks are described herein. While the housings are described as being functional for remote control vehicles, those of skill in the art shall understand that the housings may be modified for full scale vehicles.

Referring to FIGS. 1-8, in one embodiment, a housing 100 designed to hold a light saber includes a head 102, a head mount 104, and a bracket 106. The head 102 has a shaft 108 extending from a midsection 110 and a connection portion 112 extending from a bottom of the midsection 110. The midsection 110 may be tapered such that a top diameter 111a of the midsection 110 is smaller than a bottom diameter 111b. The top diameter 111a of the midsection 110 may be substantially similar to the diameter of the rod 108. A bore 114 may be formed into and extend through the shaft 108, the midsection, and the connection portion 112.

Figure 2:
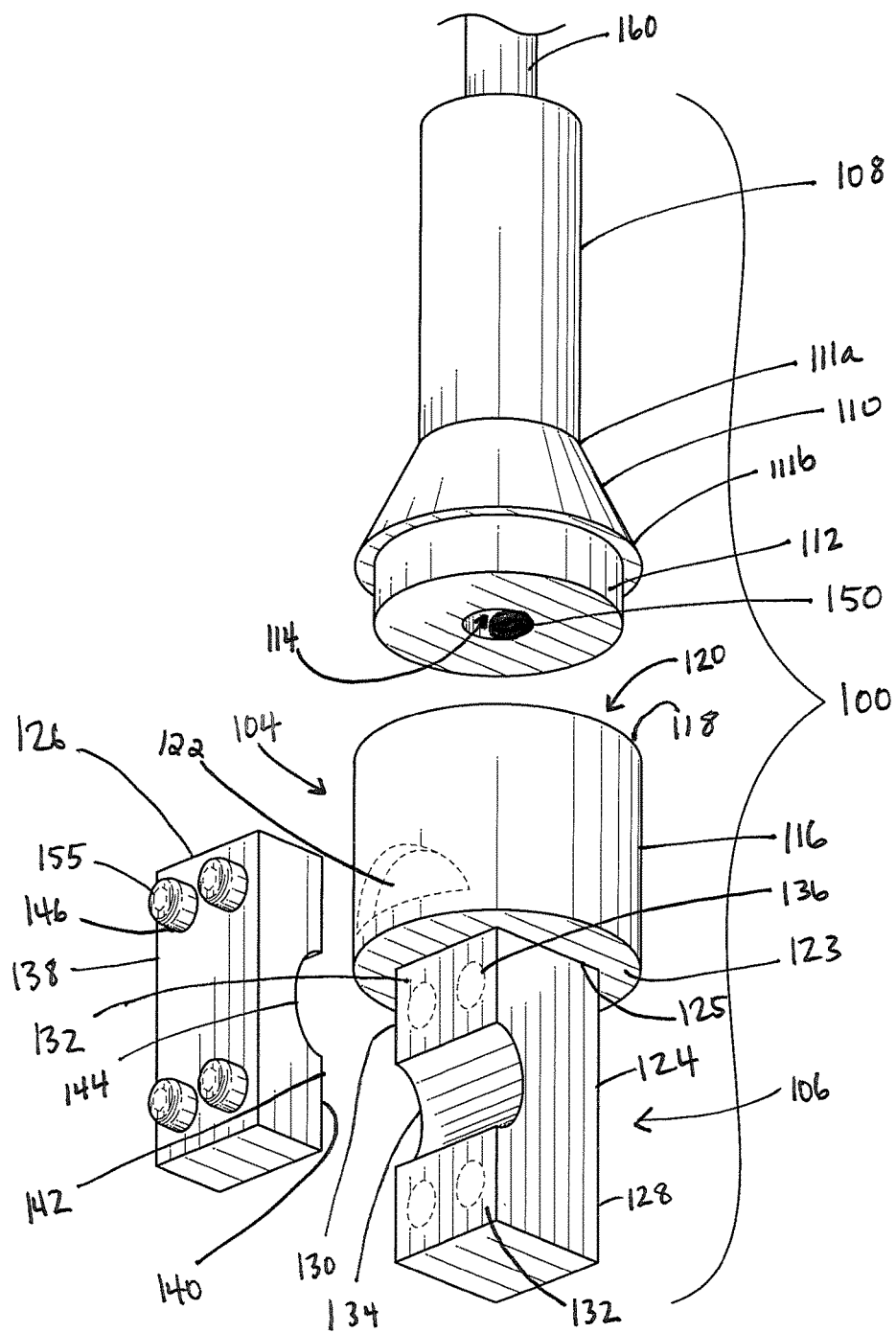
FIG. 2 is a blown up perspective view of the light housing of FIG. 1.
Figure 5:
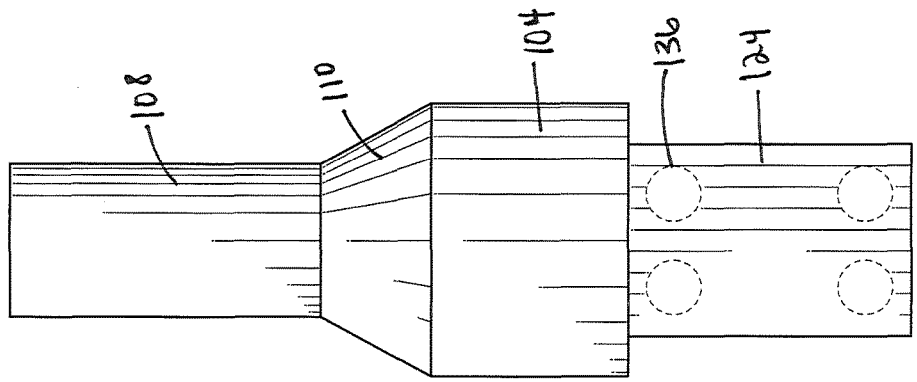
FIG. 5 is a rear view of the light housing of FIG. 1.
Figure 4:
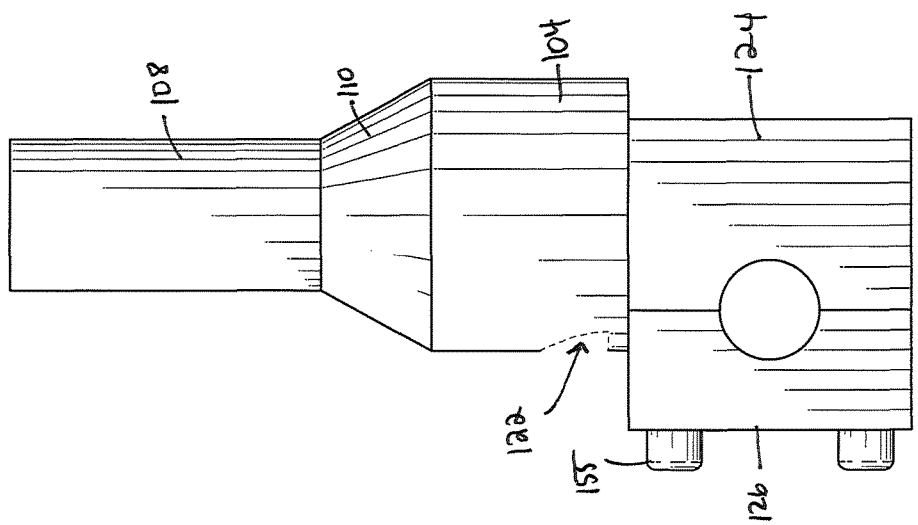
FIG. 4 is a side view of the light housing of FIG. 1.
Figure 3:
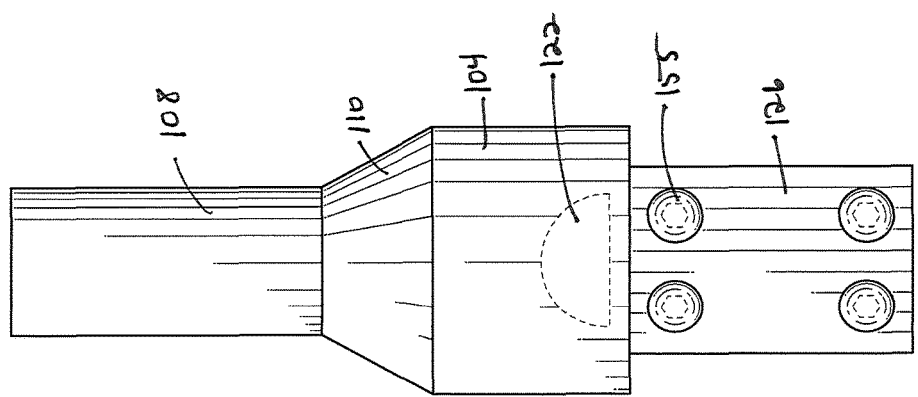
FIG. 3 is a front view of the light housing of FIG. 1.
Figure 8:
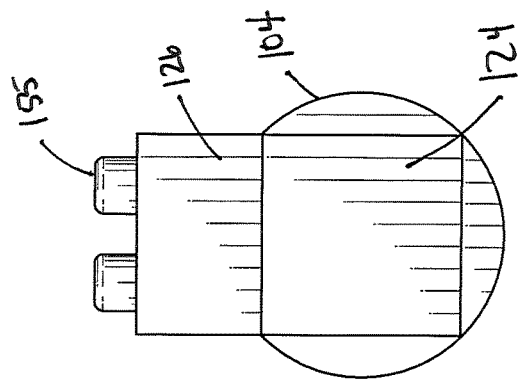
FIG. 8 is a bottom view of the light housing of FIG. 1.
Figure 7:
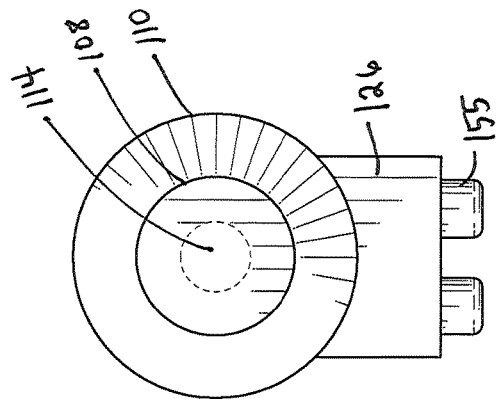
FIG. 7 is a top view of the light housing of FIG. 1.
Figure 6:
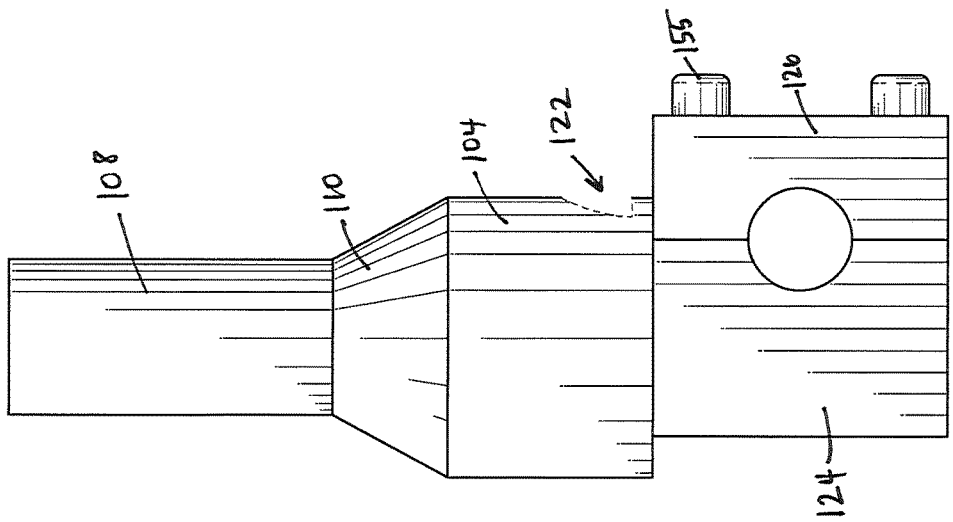
FIG. 6 is a side view of the light housing of FIG. 1.
Figure 9:
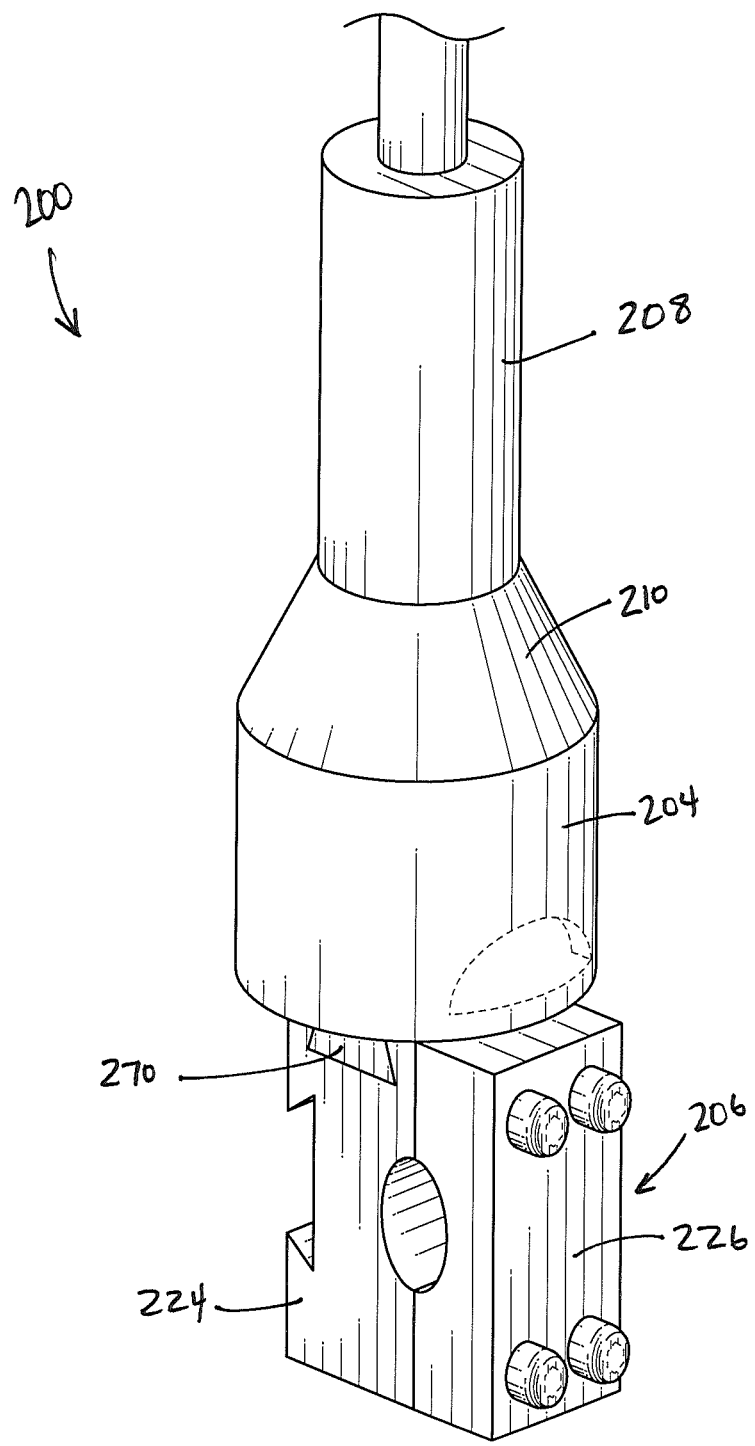
FIG. 9 is a perspective view of a light housing according to another embodiment of the invention.
Figure 10:
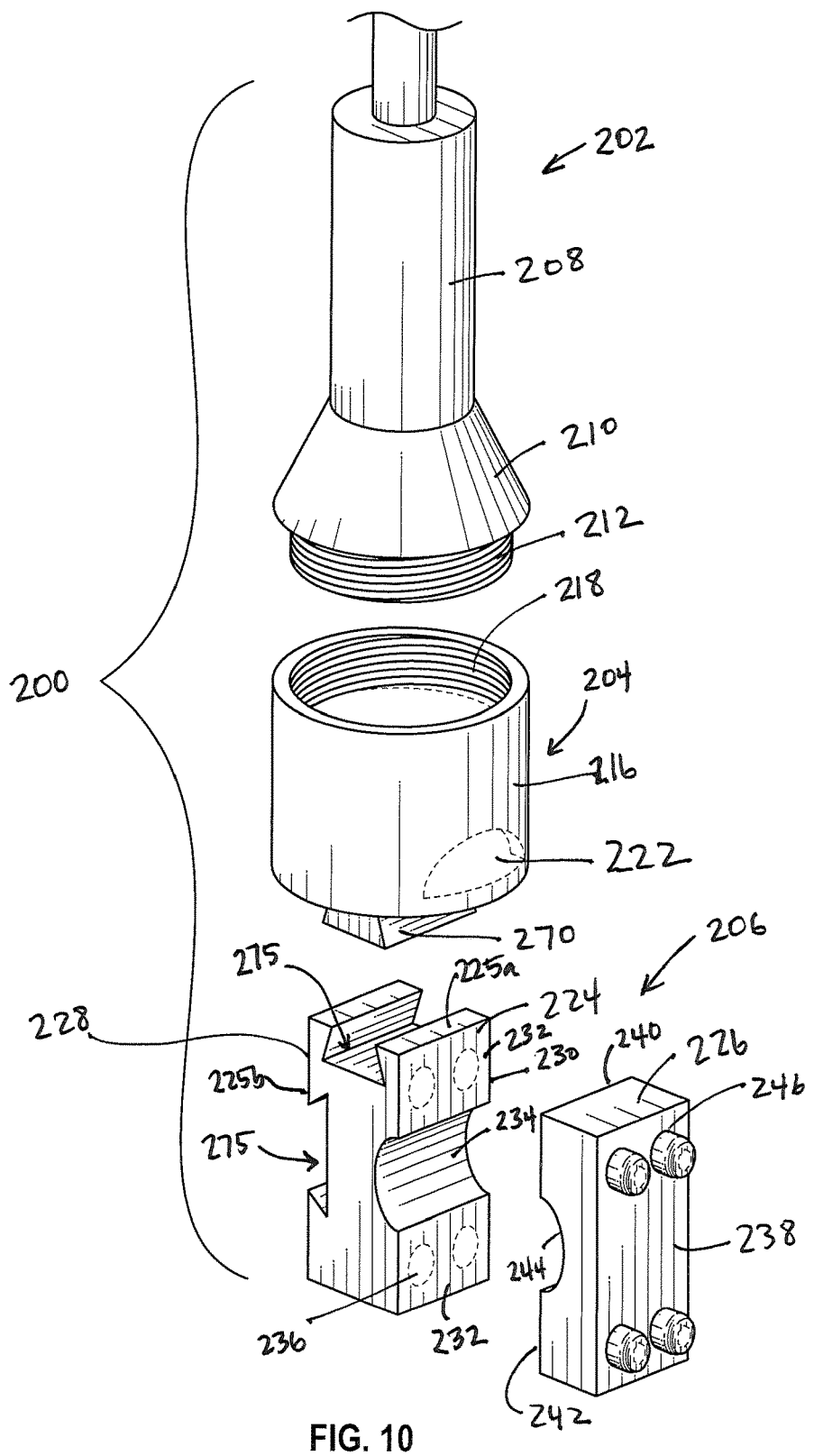
FIG. 10 is a blown up perspective view of the light housing of FIG. 1.
Figure 13:
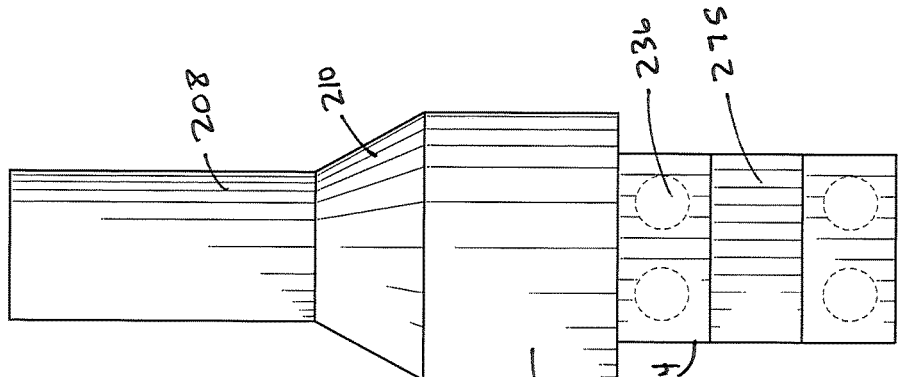
FIG. 13 is a rear view of the light housing of FIG. 1.
Figure 12:
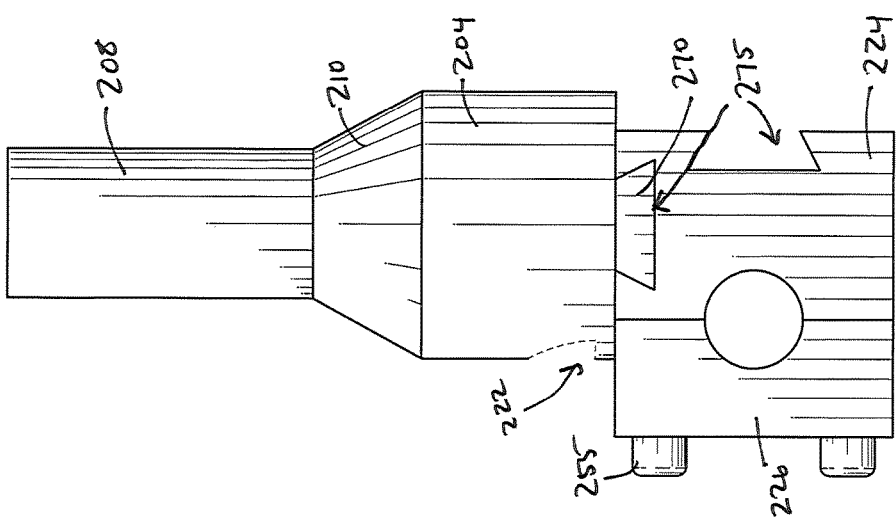
FIG. 12 is a side view of the light housing of FIG. 1.
Figure 11:
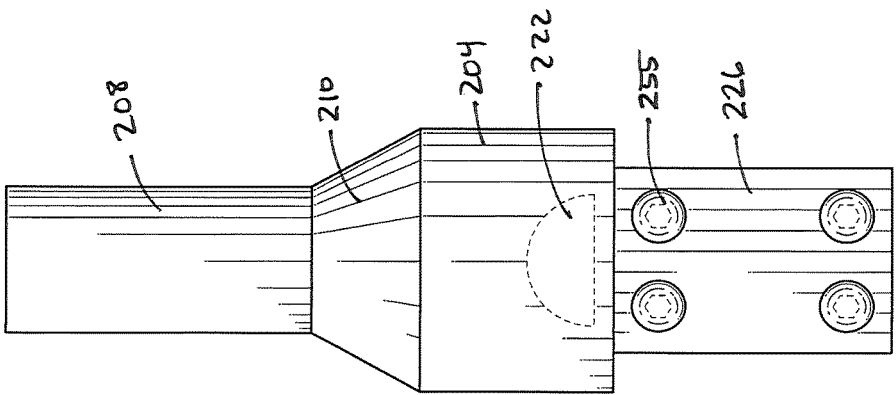
FIG. 11 is a front view of the light housing of FIG. 1.
Figure 16:
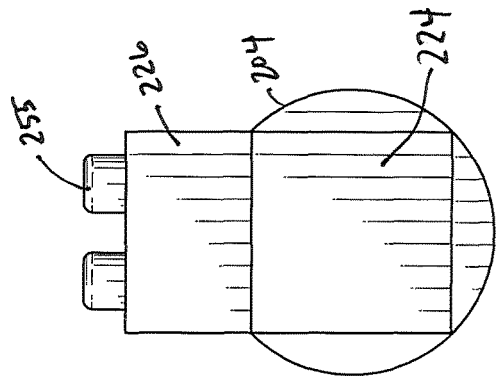
FIG. 16 is a bottom view of the light housing of FIG. 1.
Figure 15:
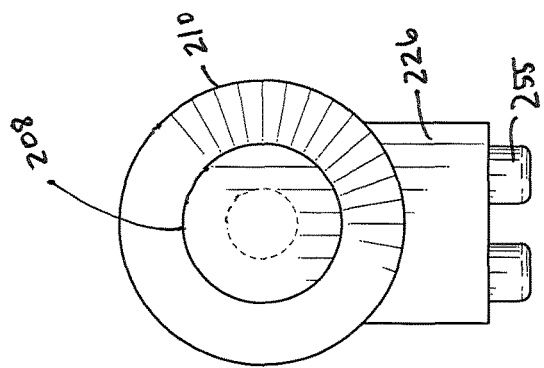
FIG. 15 is a top view of the light housing of FIG. 1.
Figure 14:
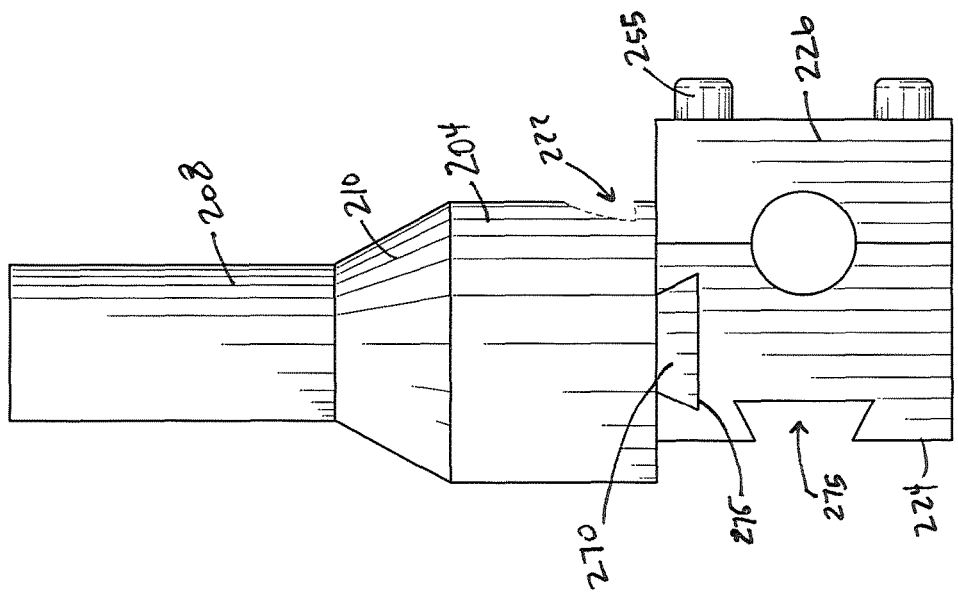
FIG. 14 is a side view of the light housing of FIG. 1.

As shown in FIG. 2, a light 155, such as a light emitting diode (LED), compact fluorescent (CFL) or other light, whether now known or later developed, may be housed at the end of the bore 114, located within the connection portion 112. It may be understood by those of skill in the art that it may be desirable to select a light that does not generate or give off a significant amount of heat. Heat build-up can be detrimental for the housing structure itself, and may also damage the wire cables discussed in greater detail below. Damage to the housing and/or the wire cables can cause further damage, including starting a fire. Accordingly, it may be preferable (although not required) for LEDs to be used with the housing 100 due to the fact that the LED gives off a relatively small amount of heat.

The light 155 may be configured such that a friction fit is formed between the light 155 and the bore 114 to prevent movement and/or disconnection of the light 155 therefrom. The light 155 is positioned within the bore 114 such that the light travels through the bore 114 and up the shaft 108. Accordingly, the shaft 108 acts as a light pipe, moving the light from the bulb 155 to the end 108a of the shaft 108.

A rod 160 may be inserted into the bore 114 at the end 108a of the shaft 108. The light travelling up the shaft 108 may thus reach the rod 160, causing the rod 160 to glow. In one embodiment, the light 155 is a single color, and the rod 160 glows the color of the light 155. In another embodiment, the light 155 is color-changing or multi-colored such that the rod 160 appears to change colors, or appears multi-colored.

In one embodiment, the rod 160 is a fiber optic cable. Fiber optic cables offer benefits over other materials, including their durability and flexibility, as well as the ability to function as an effective light pipe. As the light hits the rod 160, the fiber optic cable 160 allows the light to travel up the cable 160, functioning as a light pipe, illuminating the entire length of the cable 160. While the fiber optic cable 160 may be flexible, it is still rigid enough to allow the rod 160 to stand in an upward position, allowing the rod 160 to be seen. Further, the use of fiber optic cable may enhance the magnitude of the light in the rod 160—in other words, the light may appear brighter due to the enhanced properties of the fiber optic cable 160. In another embodiment, the rod 160 may be manufactured from any other appropriate material, including but not limited to plastic (including polymers), glass, etc. Those of skill in the art will understand that it may be preferable for the rod 160 to be constructed of a flexible material that is resistant to breakage under extreme conditions, including crash conditions.

As is known to those of skill in the art, the light 155 requires power to function. Electrical components known to those of skill in the art may be supplied in connection with the light 155. Electrical leads attached to the light 155 may be configured for connection to a power source, such as a two-cell or three-cell battery. In one embodiment, the power source may be the battery of the remote-control car. In another embodiment, the power source may be separate and apart from the battery of the remote-control car. The electrical leads may extend away from the bottom of the light 155 through a void in the central area of the connection portion 112.

In one embodiment, once the light 155 is connected to the battery via the electrical leads, the light 155 is maintained in an "on" or "activated" state. During daylight hours, the light may appear as if it were in the "off" or "deactivated" state; however, when the sun begins to set, the light 155 may become viewable. In another embodiment, the light 155 may include a switch. The switch may be configured to turn the light "on" or "off" by interrupting the flow of electricity from the battery to light 155, as is known in the art. The switch may be controlled remotely (e.g., via a remote control), or it may be on a timer (e.g., the light 155 stays on for 30 minutes when initially activated). In still another embodiment, the switch may be solar activated such that when a solar panel determines that it is daylight hours, the switch is turned to the "off" position, and when it is night time hours, the switch is turned to the "on" position. Preferably, the solar panel is disposed on an outer face of the housing 100 such that it easily receives sun light.

The connection portion 112 may be mated to the head mount 104. The head mount includes an outer structure forming an outside diameter 116 and an inside diameter 118, the inside diameter forming a hollowed out portion 120. In one embodiment, the connection portion 112 may optionally be threaded. Here, the inside edge 118 of the head mount 104 may have opposing threads into which the connection portion 112 is screwed. In another embodiment, the connection portion 112 may not be threaded. Here, the connection portion 112 may be mated to the head mount 104 via a friction fit with the inside edge 118. Accordingly, the diameter of the connection portion 112 may be substantially similar to the inside diameter 118 of the head mount 104. For aesthetic purposes, the outside diameter 116 of the head mount 104 may be substantially similar to the bottom diameter 111b of the midsection 110.

When the central portion 112 mates with the head mount 104, the void extends into the hollowed out portion 120 of the head mount 104. The electrical leads may be substantially housed within the hollowed out portion 120. In order to connect to the power source, the leads may be pulled through an aperture 122 formed into the head mount 104. Preferably, only the length of the electrical leads required to reach the power source are pulled out from the hollowed out portion 120, and the remainder of the leads are maintained within the hollowed out portion 120.

The bracket 106 includes a first section 124 and a second section 126. A bottom face 123 of the head mount 104 is secured to a top edge of the first section 124. Optionally, the head mount 104 is permanently secured to the top edge 125 of the first section 124. In one embodiment, the bracket first section 124 and the head mount 104 are formed as a single unitary piece. In another embodiment, the bracket first section 124 and the head mount 104 may be formed separately; however the bracket first section 124 may be fixed to the head mount 104 using an adhesive, chemical weld, or other suitable means.

The first section 124 of the bracket 106 includes an outer face 128 and an inner face 130. The outer face 128 may be substantially planar, although this is not required. The inner face 130 includes a substantially planar portion 132 and a scooped portion 134 formed into the substantially planar portion 132. The scooped portion 134 may generally take the shape of a half-circle. Apertures 136 may be formed in the first section 124 and extend there through. In embodiments, the apertures 136 may be formed in the area of the substantially planar portion 132.

The second section 126 may be substantially similar to the first section 124. In embodiments, the second section 126 may be a mirror image of the first section 124. Accordingly, the second section 126 may include an outer face 138 and an inner face 140. The inner face 140 includes a substantially planar portion 142 and a scooped portion 144 formed into the substantially planar portion 142. The scooped portion 144 may generally take the shape of a half-circle, and together with the first section 124, may form a full circle. Thus, when mated as described below, a hole is formed which extends through the first and second sections 124 and 126. Apertures 146 may be formed in the second section 126 and extend there through. In embodiments, the apertures 146 may be formed in the area of the substantially planar portion 142. Preferably, the location of the apertures 146 in the second section 126 corresponds to the location of the apertures 136 in the first section 124.

To mate the first and second sections 124 and 126 together, mechanical fasteners 155 may be inserted though the apertures 136 and 146, and secured in place using methods and structure known to those of skill in the art. In one embodiment, the apertures 136 and/or 146 may be threaded for receiving the mechanical fastener 155. In another embodiment, the fasteners 155 may be secured in place using a nut or other fastening mechanism. The mechanical fasteners may be any fastener now known or later developed. Non-limiting examples of mechanical fasteners include hex screws, nut and bolt combinations, and clevis pin/cotter pin combinations.

In one embodiment, strong magnets may be used to mate the sections 124 and 126 together. Rare earth magnets, which are known to be extremely strong, may be used. The magnets may be mounted to the substantially planar surfaces 132 and 142 of the sections 124 and 126.

Generally, the housing 100 will be secured to a surface. Where the surface is flat, such as a thin wall or other similar surface, the surface may be prepared to receive the housing 100 by having holes drilled therein corresponding to the location(s) of the apertures 136 and 146 in the first and second sections 124 and 126 of the bracket 106. Some planar surfaces, such as those which contain metal, may be optimal for use with the magnets, as described above.

However, the housing 100 is also configured for use with curved surfaces, such as roll cages in vehicles. Cylindrical surfaces are referred to generally here, as the housing 100 may be used with other curved objects as well. Here, the scooped out portions 134 and 144 of the respective first and second sections 124 and 126 may be positioned around the cylindrical surface, and mechanical fasteners 155 may be inserted through the respective apertures 136 and 146 to secure the bracket 106 thereto.

A second embodiment of a housing 200 is illustrated in FIGS. 9-16. The housing 200 is substantially similar to the housing 100 except as is described herein or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers between 200 and 299 may be used to indicate parts corresponding to those discussed above numbered between 100 and 199 (e.g., head 202 corresponds generally to the housing 102), though with any noted or shown deviations.

In the housing 200, the head 202 includes a rod 208, a midsection 210, and a connection portion 212. The rod 208 may include a plurality of apertures formed therein, which may allow light to escape from the rod 208.

The head mount 204 includes an outside diameter 216 and an inside diameter 218 forming a hollowed out portion 220. An aperture 222 formed in the head mount 204 is similar to aperture 122. Rather than being secured to the first bracket section 224, however, the head mount 204 may include a male linkage member 270. The male linkage member 270 may be formed together with the rest of the head mount 204 as a unitary piece. As shown in the figures, the male linkage member 270 may have a trapezoidal shape; however, the shape shall not be limited to a trapezoid, and may take any shape sufficient to hold the head mount to the bracket first portion 224 as described below.

The bracket portion 206, like the bracket portion 106, includes a first section 224 and a second section 226. The bracket first section 224 includes an outer face 228 and an inner face 230. The inner face 230 includes a substantially planar portion 232 and a scooped portion 234 formed into the substantially planar portion 232. The scooped portion 234 may generally take the shape of a half-circle. Apertures 236 may be formed in the first section 224 and extend there through. In the embodiment 200, the bracket first section 224 further includes at least one female linkage member 275 formed into one or more faces of the bracket first section 224. For example, a top face 225a and a side face 225b of the bracket first section 224 may have a female linkage member 275 formed therein; however, the female linkage member 275 may be formed in any one or several faces of the bracket first section 224. As will be understood by those of skill in the art, the female linkage member 275 may have a shape corresponding to the male linkage member 270 such that the male linkage member 270 may be received therein.

The second section 226 may be substantially similar to the second section 126. The second section 226 may be a mirror image of the first section 224. Accordingly, the second section 226 may include an outer face 238 and an inner face 240. The inner face 240 includes a substantially planar portion 242 and a scooped portion 244 formed into the substantially planar portion 242. The scooped portion 244 may generally take the shape of a half-circle, and together with the first section 224, may form a full circle. Thus, when mated as described above with respect to embodiment 100, a hole is formed which extends through the first and second sections 224 and 226. Apertures 246 may be formed in the second section 226 and extend there through. In embodiments, the apertures 246 may be formed in the area of the substantially planar portion 242. Preferably, the location of the apertures 246 in the second section 226 corresponds to the location of the apertures 236 in the first section 224.

The housing 100 or 200 may be constructed of any appropriate material. In one embodiment, the housing 100 or 200 is made of a plastic (e.g., Polyethylene terephthalate (PET or PETE), High-density polyethylene (HDPE), Polyvinyl chloride (PVC). Low-density polyethylene (LUPE), Polypropylene (PP), Polystyrene (PS), etc.). In another embodiment, the housing 100 or 200 are constructed of metal (e.g., aluminum, steel, etc.).

It may be desirable for one or more components of the housing 100 or 200 to be waterproof. Using methods known to those of skill in the art, the light and electrical components may be coated in a waterproof or water resistant coating to provide protection from the elements. Alternately, or additionally, one or more components such a portion of the light and/or electrical components may be covered in waterproof heat shrink for protection.

It is foreseen that the housing 100 or 200 will be useful in conjunction with remote control vehicles. However, the housing 100 or 200 may also be suitable for other applications, including in full-scale vehicles, boats, ATVs, etc.

Many different arrangements of the described invention are possible without departing from the spirit and scope of the present invention. Embodiments of the present invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the present invention.

Further, it will be understood that certain features and subcombinations are of utility and may be employed without reference to other features and subcombinations and are contemplated within the scope of the claims. Not all steps listed in the various figures and description need to be carried out in the specific order described. The description should not be restricted to the specific described embodiments.

The invention claimed is:

1. A housing for a light stick, comprising:
   a head comprising:
      a midsection;
      a shaft extending in a first direction from the midsection, and a connection member extending in a second direction from the midsection; and
      a bore extending through the entirety of the length of the midsection, the shaft, and the connection member;
   a head mount, comprising:
      a hollow receiving member, the receiving member being open at a first end and having a bottom face at a second end;
      wherein, the head connection member is received into the open end of the hollow receiving member; and
   a bracket, comprising:
      first and second bracket sections, each section comprising an outside face and an inside face, the inside face comprising a substantially planar portion and a scooped portion formed into the substantially planar portion, and a plurality of apertures formed into the substantially planar portion; wherein, a top face of the first bracket section is fixed to the bottom face of the hollow receiving member; and
   wherein, in a use position, the first bracket section inside face is positioned against a first side of a surface, the second bracket section inside face is positioned against a second opposing side of the surface, and the first and second bracket sections are secured together using mechanical fasteners inserted through the plurality of apertures in the first and second bracket sections.

2. The housing of claim 1, wherein a rod is inserted into the bore in the shaft forming a friction fit between the rod and the shaft.

3. The housing of claim 2, wherein the rod is a fiber optic cable.

4. The housing of claim 2, wherein a light is inserted into the bore in the connection member, the light being positioned such that, in an activated state, the light shines up the shaft via the bore.

5. The housing of claim 4, wherein the light is an LED.

6. The housing of claim 4, wherein the light includes electronic components for the operation thereof, the electronic components being configured for use with a power source.

7. The housing of claim 6, wherein at least a portion of the light and the electronic components are coated in a waterproof coating.

8. The housing of claim 6, wherein the electronic components include electrical lead wires, and wherein the electrical lead wires are at least partially passed through an aperture formed in the hollow receiving member for connecting the light to the power source.

9. The housing of claim 8, wherein the power source is one of solar power and battery power.

10. A housing for a light stick, comprising:
    a head comprising:
       a tapered midsection having a top edge with a first diameter and a bottom edge with a second diameter, the bottom diameter being larger than the top diameter;
       a shaft extending in a first direction from the top edge of the midsection, a diameter of the shaft being substantially similar to the first diameter of the midsection, and a connection member extending in a second direction from the midsection;
       a bore extending through the entirety of the length of the midsection, the shaft, and the connection member;
       a rod inserted into the bore at a top edge of the shaft forming a friction fit between the rod and the shaft; and
       a light inserted into the bore at a bottom edge of the connection member forming a friction fit between the rod and the connection member;
    a head mount, comprising:
       a hollow receiving member, the receiving member being open at a first end and having a bottom face at a second end, and having an aperture formed therein;
       wherein the connection member of the head is received into the hollow receiving member; and
    a bracket, comprising:
       first and second bracket sections, each section comprising an outside face and an inside face, the inside face comprising a substantially planar portion and a scooped portion formed into the substantially planar portion, and a plurality of apertures formed into the substantially planar portion wherein one of the first and second bracket sections is disposed substantially adjacent the receiving member bottom face; and
    wherein, in a use position, the first bracket section inside face is positioned against a first side of a surface, the second bracket section inside face is positioned against a second opposing side of the surface, and the first and second bracket sections are secured together using mechanical fasteners inserted through the plurality of apertures in the first and second bracket sections.

11. The housing of claim 10, wherein:
    a male linkage member extends from the bottom face of the hollow receiving member; and
    the first bracket section includes a female linkage member formed into a face of the first bracket section;
    wherein the male linkage member is received into the female linkage member to connect the head mount to the bracket first section.

12. The housing of claim 11, wherein the rod is a fiber optic cable.

13. The housing of claim 12, wherein the light is an LED.

14. The housing of claim 13, wherein the light is electrically connected to a power source, the power source being remote from the housing.

15. A housing for a light stick, comprising:
- a head comprising:
  - a shaft and a connection member; and
  - a bore extending through the entirety of the length of the shaft and the connection member;
  - a rod inserted into the bore at a top edge of the shaft; and
  - a light inserted into the bore at a bottom edge of the connection member;
- a head mount, comprising:
  - a hollow receiving member, the receiving member being open at a first end and closed at a second end, the second end forming a bottom face;
  - wherein the connection member of the head is received into the hollow receiving member; and
- a bracket, comprising:
  - first and second bracket sections, each section comprising an outside face and an inside face, and a plurality of apertures formed there through, wherein the receiving member bottom face is disposed substantially adjacent one of the first and second bracket sections.

16. The housing of claim 15, wherein:
an outside edge of the connection member is threaded;
an inside edge of the hollow receiving member is threaded; and
the connection member is screwed into the hollow receiving member.

17. The housing of claim 15, wherein a top face of the first bracket section is fixed to the bottom face of the hollow receiving member; and wherein, in a use position, the first bracket section inside face is positioned against a first side of a surface, the second bracket section inside face is positioned against a second opposing side of the surface, and the first and second bracket sections are secured together using mechanical fasteners inserted through the plurality of apertures in the first and second bracket sections.

18. The housing of claim 15, wherein:
- a male linkage member extends from the bottom face of the hollow receiving member; and
- a female linkage member is formed into a face of the first bracket section;
- wherein the male linkage member is received into the female linkage member to connect the head mount to the bracket first section; and
- wherein, in a use position, the first bracket section inside face is positioned against a first side of a surface, the second bracket section inside face is positioned against a second opposing side of the surface, and the first and second bracket sections are secured together using mechanical fasteners inserted through the plurality of apertures in the first and second bracket sections.

19. The housing of claim 15, wherein the rod is a fiber optic cable.

20. The housing of claim 15, wherein the light includes electronic components for the operation thereof, the electronic components being configured for use with a power source; and wherein at least a portion of the light and the electric components are coated in a waterproof coating.

* * * * *